(12) United States Patent
Seder et al.

(10) Patent No.: US 12,352,986 B2
(45) Date of Patent: Jul. 8, 2025

(54) MULTI-PERSPECTIVE THREE-DIMENSIONAL FLOATING IMAGE DISPLAY WITH TOUCH FUNCTION

(71) Applicant: GM Global Technology Operations LLC, Detroit, MI (US)

(72) Inventors: Thomas A. Seder, Fraser, MI (US); Kai-Han Chang, Sterling Heights, MI (US); Joseph F. Szczerba, Grand Blanc, MI (US); Manoj Sharma, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 596 days.

(21) Appl. No.: 17/842,272

(22) Filed: Jun. 16, 2022

(65) Prior Publication Data

US 2023/0408841 A1    Dec. 21, 2023

(51) Int. Cl.
*G02B 30/56* (2020.01)
*G02B 27/10* (2006.01)
*G02B 30/35* (2020.01)

(52) U.S. Cl.
CPC ............. *G02B 30/56* (2020.01); *G02B 27/10* (2013.01); *G02B 30/35* (2020.01)

(58) Field of Classification Search
CPC ...... G02B 30/00–60; G02B 27/00–648; G02B 2027/0105–0198; B60K 35/00–90; B60K 2360/00–96; B60K 2370/00
See application file for complete search history.

(56) References Cited

U.S. PATENT DOCUMENTS

| | | | |
|---|---|---|---|
| 10,318,043 B2 | 6/2019 | Seder et al. | |
| 11,077,844 B2 | 8/2021 | Szczerba | |
| 2010/0046050 A1 | 2/2010 | Kroll et al. | |
| 2013/0100527 A1* | 4/2013 | Chung | G03B 21/14 |
| | | | 359/449 |
| 2013/0321776 A1* | 12/2013 | Loong | G02B 27/0103 |
| | | | 353/7 |
| 2017/0322513 A1 | 11/2017 | Zapanta | |
| 2018/0147985 A1 | 5/2018 | Brown et al. | |
| 2019/0243151 A1 | 8/2019 | Hansen | |
| 2021/0023948 A1 | 1/2021 | Knittl et al. | |
| 2023/0039608 A1 | 2/2023 | Ji et al. | |
| 2023/0375829 A1 | 11/2023 | Seder et al. | |

OTHER PUBLICATIONS

U.S. Appl. No. 17/824,210, filed May 25, 2022, pp. 67-88.
U.S. Appl. No. 17/746,243, filed May 17, 2022, pp. 18-35.

* cited by examiner

*Primary Examiner* — Christopher A Lamb, II
(74) *Attorney, Agent, or Firm* — Vivacqua Crane, PLLC

(57) ABSTRACT

A system for generating a centrally located floating three-dimensional image display for a plurality of passengers positioned within a vehicle includes at least one display adapted to project a multiplexed image, a plurality of beam splitters, one beam splitter individually associated with each one of the plurality of passengers, and at least one passenger interface, each beam splitter adapted to receive a image from the at least one display and to reflect the image to the associated one of the plurality of passengers, wherein, each of the plurality of passengers perceives the image floating at a central location within the vehicle, the at least one passenger interface adapted to allow the plurality of passengers to receive annotated information and to provide input to the system.

20 Claims, 3 Drawing Sheets

MULTI-PERSPECTIVE THREE-DIMENSIONAL FLOATING IMAGE DISPLAY WITH TOUCH FUNCTION

INTRODUCTION

The present disclosure relates to a system for generating a floating image viewable by a plurality of passengers within a vehicle.

Current entertainment systems within vehicles generally comprise a screen or monitor that is mounted within the vehicle for viewing by the passengers. Some systems include smaller individual screens, wherein each passenger has a screen for their personal viewing. Current systems that provide virtual holographic images do not include the ability for annotation and for information that cannot be embedded within the virtual holographic image to be presented with the virtual holographic image. In addition, current systems do not include tactile properties that allow a passenger to interact with the virtual holographic image, such as by making selections or choosing different images to view.

While current systems achieve their intended purpose, there is a need for a new and improved system for providing a floating three-dimensional image that appears centrally located within the vehicle to all the passengers within the vehicle.

SUMMARY

According to several aspects of the present disclosure, a system for generating a centrally located floating three-dimensional image display for a plurality of passengers positioned within a vehicle includes at least one display adapted to project an image, a plurality of beam splitters, one beam splitter individually associated with each one of the plurality of passengers, and at least one passenger interface, each beam splitter adapted to receive an image from the at least one display and to reflect the image to the associated one of the plurality of passengers, wherein, each of the plurality of passengers perceives the image floating at a central location within the vehicle, the at least one passenger interface adapted to allow the plurality of passengers to receive annotated information and to provide input to the system.

According to another aspect, the at least one passenger interface is a transparent touch screen positioned between the eyes of the plurality of passengers and the perceived image floating at the central location within the vehicle.

According to another aspect, the at least one passenger interface includes a clear cylindrical touch screen.

According to another aspect, the at least one passenger interface includes a plurality of transparent touch screens, one touch screen individually associated with each one of the plurality of passengers.

According to another aspect, each one of the plurality of touch screens is incorporated into one of the plurality of beam splitters.

According to another aspect, each one of the plurality of touch screens is adapted to present visible displayed information only to the associated one of the plurality of passengers.

According to another aspect, each one of the plurality of touch screens is transparent and has a first side and a second side, information displayed on each one of the plurality of touch screens being visible only on the first side.

According to another aspect, each one of the plurality of touch screens is one of flat and curved.

According to another aspect, the at least one passenger interface is an organic light-emitting diode.

According to another aspect, the system includes a monitoring system adapted to monitor the position of a head and eyes of each one of the plurality of passengers, wherein, for each of the plurality of passengers, the system is adapted to display information at a specific location on the at least one passenger interface based on a position of the head and eyes of the passenger.

According to another aspect, for each of the plurality of passengers, the system is adapted to display information at a specific location on the at least one passenger interface based on the position of the head and eyes of the passenger relative to the perceived image, such that, for each of the plurality of passengers, information displayed on the at least one passenger interface is properly positioned relative to the perceived image.

According to another aspect, the system is adapted to accept input from a passenger based solely on contact between the passenger and the at least one passenger interface.

According to another aspect, the system is adapted to accept input from a passenger based on contact between the passenger and the at least one passenger interface and based on the location of a point of contact between the passenger and the at least one passenger interface relative to the perceived image.

According to another aspect, the at least one display is mounted to one of a roof within the vehicle and within a floor within the vehicle.

According to another aspect, each of the plurality of beam splitters is transparent, wherein a passenger can see through the beam splitter.

According to another aspect, each of the plurality of beam splitters is one of mounted to and hanging down from a roof of the vehicle, mounted to and supported from a floor of the vehicle, and mounted to and supported on an armrest within the vehicle.

According to another aspect, an orientation of each of the plurality of beam splitters is one of fixed and adjustable.

According to another aspect, each of the plurality of beam splitters is equipped with head tracking capability, wherein an orientation of each of the plurality of beam splitters changes automatically in response to movement of a head of a passenger.

According to another aspect, each of the plurality of beam splitters has one of a flat profile and a curved profile.

According to several aspects of the present disclosure, a system for generating a centrally located floating three-dimensional image display for a plurality of passengers positioned within a vehicle includes at least one display adapted to project an image, a plurality of transparent beam splitters, one beam splitter individually associated with each one of the plurality of passengers, and at least one passenger interface, each beam splitter adapted to receive a image from the at least one display and to reflect the image to the associated one of the plurality of passengers, wherein, each of the plurality of passengers perceives the image floating at a central location within the vehicle, the at least one passenger interface including a transparent touch screen positioned between the eyes of the plurality of passengers and the perceived image floating at the central location within the vehicle and adapted to allow the plurality of passengers to receive annotated information and to provide input to the system, the at least one passenger interface further including one of a clear cylindrical touch screen, a plurality of clear touch screens, one touch screen individually associated with each one of the plurality of passengers and adapted to present visible displayed information only to the associated one of the plurality of passengers, and a plurality of clear touch screens, one of the plurality of touch screens incorporated into each one of the plurality of beam splitters, and adapted to present visible displayed information only to the associated one of the plurality of passengers, the system further including a monitoring system adapted to monitor the position of a head and eyes of each one of the plurality of passengers, wherein, for each of the plurality of passengers, the system is adapted to display information at a specific location on the at least one passenger interface based on a position of the head and eyes of the passenger relative to the perceived image, such that, for each of the plurality of passengers, information displayed on the at least one passenger interface is properly positioned relative to the perceived image, the system further adapted to accept input from a passenger based on contact between the passenger and the at least one passenger interface and based on the location of a point of contact between the passenger and the at least one passenger interface relative to the perceived image.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

Figure 1:
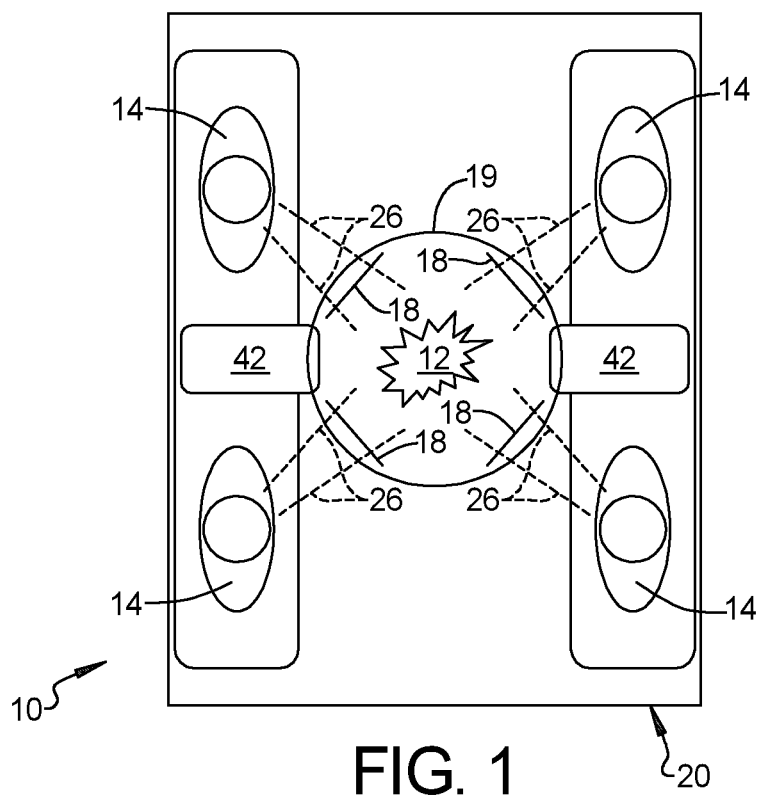
FIG. 1 is a schematic top view of a vehicle compartment having a system in accordance with an exemplary embodiment of the present disclosure.

The figures are not necessarily to scale, and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

The following description is merely exemplary in nature and is not intended to limit the present disclosure, application, or uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Although the figures shown herein depict an example with certain arrangements of elements, additional intervening elements, devices, features, or components may be present in actual embodiments. It should also be understood that the figures are merely illustrative and may not be drawn to scale.

As used herein, the term "vehicle" is not limited to automobiles. While the present technology is described primarily herein in connection with automobiles, the technology is not limited to automobiles. The concepts can be used in a wide variety of applications, such as in connection with aircraft, marine craft, other vehicles, and consumer electronic components.

Figure 2:
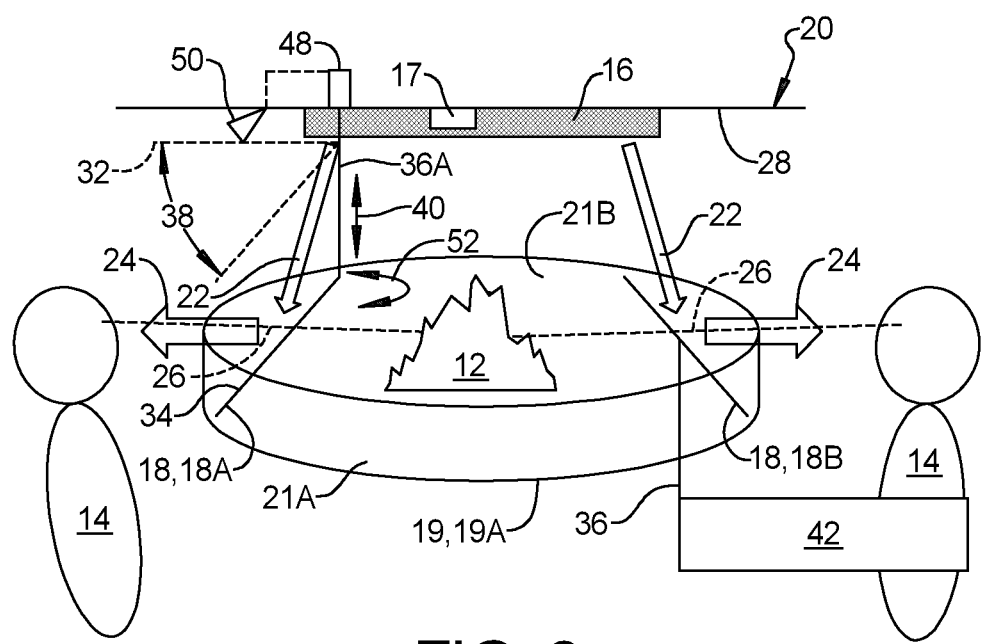
FIG. 2 is a schematic side view of two passengers within a vehicle compartment having a system according to an exemplary embodiment, wherein the at least one display is mounted onto a roof of the vehicle compartment.

Referring to FIG. 1 and FIG. 2, a system 10 for generating a centrally located floating image 12 display for a plurality of passengers 14 positioned within a vehicle, includes at least one display 16 that is adapted to project a plurality of three-dimensional images and a plurality of beam splitters 18, one beam splitter 18 individually associated with each one of the plurality of passengers 14. In an exemplary embodiment, the plurality of three-dimensional images are generated via holographic method, pre-computed and encoded into a hologram generator 17 within the display 16.

At least one passenger interface 19 is positioned between the eyes of the plurality of passengers 14 and the perceived image 12 floating at the central location within the vehicle. In an exemplary embodiment, the at least one passenger interface 19 is a transparent touch screen that is adapted to allow the plurality of passengers 14 to receive annotated information and to provide input to the system 10. Referring to FIG. 1 and FIG. 2, in an exemplary embodiment, the at least one passenger interface 19 includes a clear cylindrical touch screen 19A. The clear cylindrical touch screen 19A encircles the floating image 12, and is thereby positioned between the eyes of the plurality of passengers 14 and the perceived image 12 floating at the central location within the vehicle. In an exemplary embodiment, the at least one passenger interface 19 is an organic light-emitting diode (OLED). It should be understood, that the at least one passenger interface 19 may be other types of transparent touch screen displays known in the art.

Figure 3:
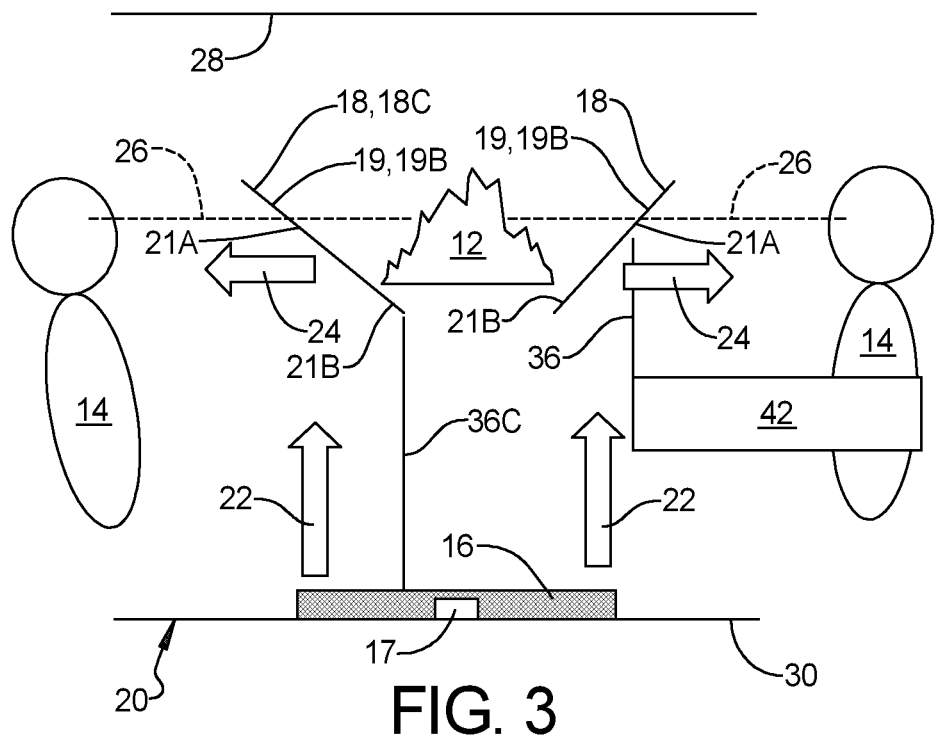
FIG. 3 is a schematic side view of two passengers within a vehicle compartment having a system according to an exemplary embodiment, wherein the at least one display is mounted onto a floor of the vehicle compartment.

Referring to FIG. 3, in another exemplary embodiment, the at least one passenger interface 19 includes a plurality of clear touch screens 19B, one touch screen 19B individually associated with each one of the plurality of passengers 14.

In one exemplary embodiment, the plurality of transparent touch screens 19B are independent and positioned between the eyes of the associated passenger 14 in proximity to the beam splitter 18 that is associated with the passenger 14. In another exemplary embodiment, each one of the plurality of touch screens 19B is incorporated into one of the plurality of beam splitters 18. Each beam splitter 18 is associated with one of the plurality of passengers 14, and one of the plurality of touch screens 19B is incorporated within each one of the beam splitters 18 to allow interaction between the associated passenger 14 and the system 10. Each of the plurality of passenger interfaces 19, 19A, 19B is adapted to present visible displayed information only to the passenger 14 that is directly in front of a portion of the passenger interface 19, as with the cylindrical touch screen 19A, or alternatively, only to the passenger 14 associated with the beam splitter 18 within which the touch screen 19B is incorporated. The nature of the transparent touch screens 19A, 19B is such that the displayed information is only displayed on a first side 21A of the touch screen 19A, 19B. A second side 21B of the transparent touch screen 19A, 19B does not display information, and thus, when viewed by the other passengers 14, allows the other passengers to see through the transparent touch screen 19A, 19B.

Referring again to FIG. 1, in an exemplary embodiment, a vehicle compartment 20 includes a plurality of seating positions occupied by a plurality of passengers 14. Each beam splitter 18 is adapted to be viewed by one of the passengers 14. Referring to FIG. 2, the display 16 is adapted to project the plurality of three-dimensional images to one of the plurality of beam splitters 18, as indicated by arrows 22. Each of the plurality of beam splitters 18 is adapted to receive one of the plurality of three-dimensional images from the display 16 and to reflect the one of the plurality of three-dimensional images from the display 16 to one of the plurality of passengers 14, as indicated by arrows 24. Each of the plurality of passengers 14 perceives the floating image 12 at a location centrally located relative to all of the passengers 14, as indicated by lines 26.

In an exemplary embodiment, the display 16 is adapted to project a three-dimensional image with variable virtual image distance. Three-dimensional images with variable virtual image distance allows the system 10 to project a floating image 12 to the passenger 14 with the capability of making the floating image 12 appear closer or further away from the passenger 14.

Referring to FIG. 2, in an exemplary embodiment, the display 16 is mounted to a roof 28 within the vehicle compartment 20. Alternatively, referring to FIG. 3, in another exemplary embodiment, the display 16 is mounted within a floor 30 within the vehicle compartment 20. The display 16 may be mounted directed onto the floor 30 surface of the vehicle compartment 20, or the display 16 may be recessed within the floor 30.

Referring to FIG. 2 and FIG. 3, each of the plurality of beam splitters 18 and the passenger interface 19, 19A, 19B is transparent, wherein a passenger 14 can see through the beam splitter 18 and the passenger interface 19, 19A, 19B, as indicated at 26. This allows the passenger 14 to perceive the floating image 12 at a distance beyond the beam splitter 18 and further, allows the passenger 14 to see through the beam splitter 18 and able to see the interior of the vehicle compartment 20 and other passengers 14 therein.

Referring to FIG. 2, a beam splitter 18A is shown, wherein the beam splitter 18A is moveable between a retracted position 32 and an extended position 34. In an exemplary embodiment, the beam splitter 18A is mounted onto a support shaft 36A that hangs down from the roof 28 of the vehicle compartment 20. In the retracted position 32, the beam splitter 18A is positioned adjacent to the display 16 and parallel to the roof 28 of the vehicle compartment 20. The beam splitter 18A is pivotal relative to the support shaft 36A, as indicated by arrow 38, and the support shaft 36 is extendable vertically up and down, as indicated by arrow 40. From the retracted position 32, the beam splitter 18A is pivoted down, and the support shaft 36A is extended downward to place the beam splitter 18A in the extended position 34 for use. When in the extended position 34, the beam splitter 18A is in operation proximity to the display 16 and the passenger 14.

Referring again to FIG. 2, a beam splitter 18B is shown, wherein the beam splitter 18B is mounted onto an armrest 42 next to the passenger 14. The beam splitter 18B is attached to a support shaft 36B that is attached to the armrest 42. While not shown, the beam splitter 18B supported on the armrest 42 may also be moveable from a retracted position to an extended position. In one exemplary embodiment, the beam splitter 18B is stowed within the armrest 42 when in the retracted position.

Referring again to FIG. 3, a beam splitter 18C is shown, wherein the beam splitter 18C is mounted onto a support shaft 36C extending upward from the floor 30 of the vehicle compartment 20. While not shown, the beam splitter 18C supported from the floor 30 of the vehicle compartment 20 may also be moveable from a retracted position to an extended position. In one exemplary embodiment, the beam splitter 18C is stowed within the floor 30 of the vehicle compartment 20 when in the retracted position.

Figure 4:
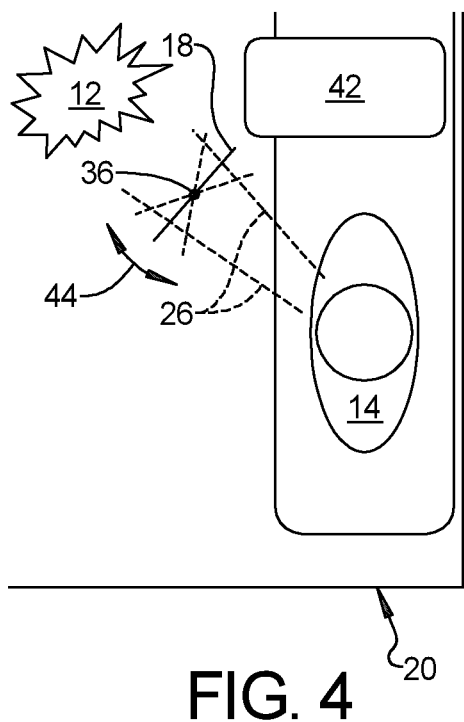
FIG. 4 is a schematic top view of a portion of a vehicle compartment including a beam splitter that is horizontally pivotal.
Figure 5:
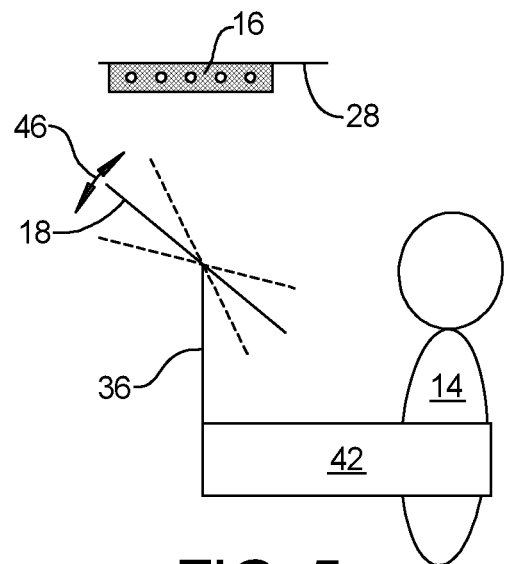
FIG. 5 is a schematic side view of a portion of a vehicle compartment including a beam splitter that is vertically pivotal.

In an exemplary embodiment, an orientation of each of the plurality of beam splitters 18 is fixed. Thus, when the beam splitters 18 are in the extended position 34 angular orientation vertically and horizontally relative to the support shaft 36A, 36B, 36C is fixed. Alternatively, in another exemplary embodiment, an orientation of each of the plurality of beam splitters 18 is adjustable. Referring to FIG. 4, the beam splitter 18 is pivotally mounted onto the support shaft 36 wherein the beam splitter 18 is pivotal horizontally about an axis as shown by arrow 44. Referring to FIG. 5, the beam splitter 18 is pivotally mounted onto the support shaft 36 wherein the beam splitter 18 is vertically pivotal, as indicated by arrow 46. Adjustability of the beam splitter 18 allows the beam splitter 18 to be positioned according to the position of the passenger 14 within the vehicle compartment 20, and according to the height of the passenger 14, ensuring that the system 10 can be customized to accommodate passengers of different size and seating position/orientation preferences. In addition, adjustability of the orientation of the beam splitter 18 allows the perceived location of the floating image 12 to be adjusted according to the passenger's preferences.

In an exemplary embodiment, each of the plurality of beam splitters 18 is equipped with head tracking capability, wherein an orientation of each of the plurality of beam splitters 18 changes automatically in response to movement of a head of a passenger 14. Referring to FIG. 2, the support shaft 36A is attached to a pivotal motor 48 in communication with a monitoring system 49 within the vehicle. Monitoring systems within a vehicle include cameras that monitor head and eye movement of a driver/passenger within the vehicle. A camera 50 of a driver/passenger monitoring system is mounted within the vehicle compartment 20 and adapted to monitor head and eye movement of the passenger 14. The motor 48 receives information from the camera 50 and in response to detection of head/eye movement by the passenger 14, pivots the support shaft 36A, and the beam splitter 18A, as indicated by arrow 52, to change the orientation of the beam splitter 18A, as indicated by arrow 44 in FIG. 4. Likewise, a motor may be adapted to pivotally change the orientation of the beam splitter 18, as shown in FIG. 5, wherein the motor receives information from the camera 50 of a driver/passenger monitoring system 49, and in response to detection of head/eye movement by the passenger 14, pivots the beam splitter 18, as indicated by arrow 46 in FIG. 5.

In an exemplary embodiment, the display is adapted to selectively rotate the projected multiplexed image, and thus, the plurality of three-dimensional images to change the one of the plurality of images received by each of the plurality of beam splitters 18. In another exemplary embodiment, the at least one display 16 includes a plurality of displays 16, one display associated with each of the beam splitters 18. Each of the plurality of displays 16 can project the same image to each of the beam splitters 18, and thus to each of the passengers. Alternatively, each of the plurality of displays 16 can display a different perspective of the same image, or a different image altogether to each of the beam splitters 18.

In one exemplary embodiment, the plurality of three-dimensional images includes a plurality of three-dimensional images of the same three-dimensional object 64, each three-dimensional image being a different perspective of the three-dimensional object 64, wherein each passenger 14 perceives a different perspective of the same three-dimensional object 64.

In another exemplary embodiment, each of the plurality of three-dimensional images is a three-dimensional image of a different three-dimensional object, wherein each passenger 14 perceives a different three-dimensional object. Thus the system 10 is capable of presenting the same floating image 12 to all the passengers 14 so they can view simultaneously, or alternatively, each passenger can view a different perspective of the floating image 12 or a completely different three-dimensional image 12.

Figure 6:
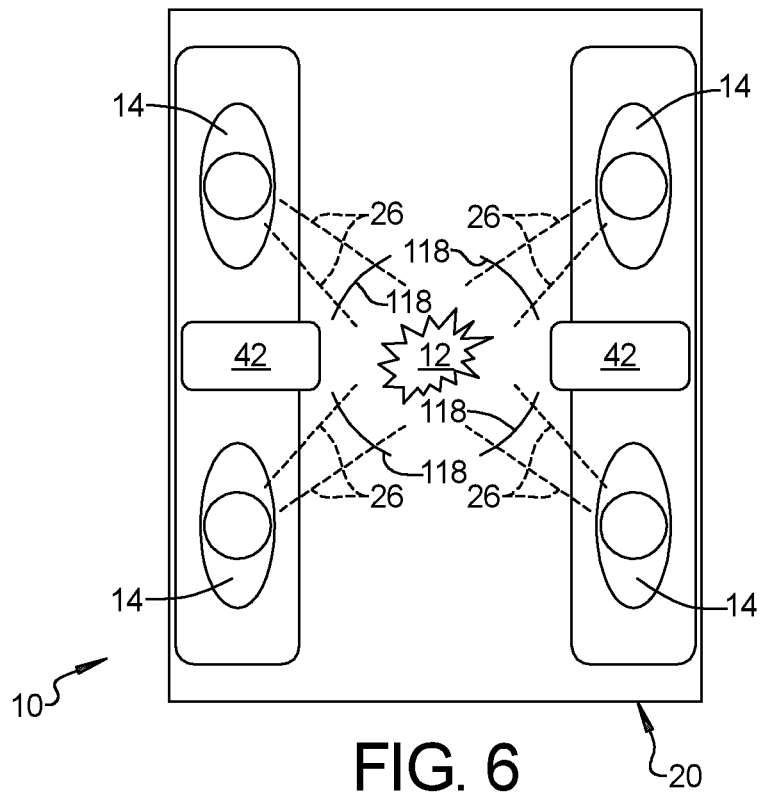
FIG. 6 is a schematic top view of a vehicle compartment having a system in accordance with an exemplary embodiment of the present disclosure, wherein the beam splitters and passenger interfaces incorporated therein have a curved profile.

Referring again to FIG. 1, in an exemplary embodiment the beam splitters 18 have a flat profile. Referring to FIG. 6, in another exemplary embodiment, each of the plurality of beam splitters 518 has a curved profile. Depending on the nature of the at least one 16, and the desired characteristics of the floating image 12, beam splitters 18 having a flat profile or beam splitters 518 having a curved profile can be utilized. Further, the curvature of a curved beam splitter 518 can be varied to further adjust the characteristics of the displayed floating image 12. Correspondingly, each of the plurality of transparent passenger interface touch screens 19 can have a flat profile, as shown with the touch screens 19B in FIG. 3, or alternatively, can have a curved profile, as shown with the cylindrical touch screen 19A in FIG. 1 and FIG. 2, or the touch screens 119B incorporated into the curved beam splitters 118 shown in FIG. 6.

In an exemplary embodiment, the monitoring system 49 is adapted to monitor the position of a head and eyes of each one of the plurality of passengers 14, wherein, for each of the plurality of passengers 14, the system 10 is adapted to display information at a specific location on the at least one passenger interface 19 based on a position of the head and eyes of the passenger 14. In another exemplary embodiment, for each of the plurality of passengers 14, the system 10 is adapted to display information at a specific location on the at least one passenger interface 19 based on the position of the head and eyes of the passenger 14 relative to the perceived image 12, such that, for each of the plurality of passengers 14, information displayed on the at least one passenger interface 19 is properly positioned relative to the perceived image 12.

Figure 7:
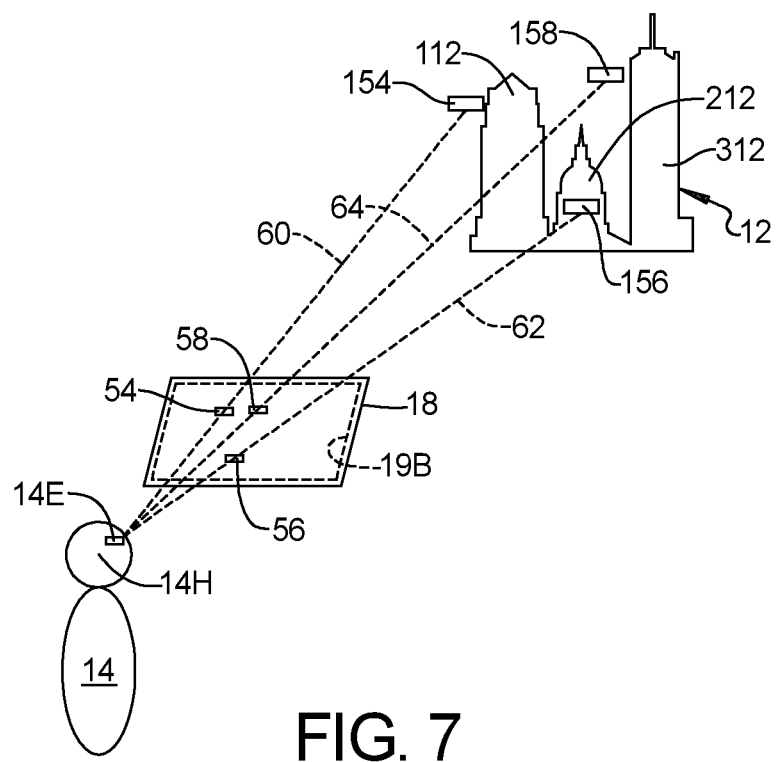
FIG. 7 is a schematic view illustrating a passenger viewing an image and annotation information through an associated beam splitter and passenger interface.

Referring to FIG. 7, in a schematic view of a passenger 14 an associated beam splitter 18 having a passenger interface touch screen 19B incorporated therein and a floating image 12, the passenger 14 perceives the floating image 12 at a distance in front of the beam splitter 18. The passenger interface 19B incorporated within the beam splitter 18 displays information related to the floating image 12 at a proper location on the passenger interface 19B so the passenger 14 sees the information at a proper location relative to the floating image 12. As shown in FIG. 7, the floating image is of a skyline, and more specifically, of three buildings, a first building 112, a second building 212, and a third building 312. The passenger interface 19B displays first building information 54, second building information 56 and third building information 58.

The first building information 54 appears in a text box and may contain information about the first building 112 as well as the option of allowing the passenger 14 to touch the first building information 54 text box to acquire additional information about the first building 112. For example, the first building information 54 text box may contain the name of the first building 112 and the street address. The passenger 14 may opt to touch the first building information 54 text box, wherein additional information will appear on the passenger interface 19B, such as the date the first building 112 was built, what type of building (office, church, arena, etc.), or statistics such as height, capacity, etc. The second building information 56 and the third building information 58 also appear in text boxes that contain similar information and the option for the passenger 14 to touch the second or third building information 56, 58 text boxes to receive additional information about the second and third buildings 212, 312.

The monitoring system 49 tracks the position of the passenger's 14 head 14H and eyes 14E and positions the first, second and third building information 54, 56, 58 text boxes at a location on the passenger interface 19B, such that when the passenger looks at the floating image 12 through the beam splitter 18 and the passenger interface 19B, the passenger 14 sees the first, second and third building information 54, 56, 58 text boxes at the proper locations relative to the floating image 12. For example, the passenger interface 19B positions the first building information 54 in the passenger's line of sight, as indicated by dashed line 60, such that the first building information 54 is perceived by the passenger 14 at a location immediately adjacent the first building 112, as indicated at 154. Correspondingly, the passenger interface 19B positions the second building information 56 in the passenger's line of sight, as indicated by dashed line 62, and the third building information 58 in the passenger's line of sight, as indicated by dashed line 64, such that the second and third building information 56, 58 is perceived by the passenger 14 at a location superimposed on the building, in the case of the second building 212, as indicated at 156, and at a location immediately adjacent the building, in the case of the third building 312, as indicated at 158.

The monitoring system 49 continuously tracks movement of the head 14H and eyes 14E of the passenger 14 and adjusts the position that the first, second and third building information 54, 56, 58 are displayed on the passenger interface 19B to ensure that the passenger 14 always perceives the first, second and third building information 54, 56, 58 at the proper locations 154, 156, 158 relative to the floating image 12.

In an exemplary embodiment, the system 10 is adapted to accept input from a passenger 14 based solely on contact between the passenger 14 and the at least one passenger interface 19. For example, when a passenger 14 reaches out to touch a finger-tip to the passenger interface 19, the passenger interface takes the input based solely on the point of contact between the tip of the finger of the passenger and the passenger interface 19.

In another exemplary embodiment, the system 10 is adapted to accept input from a passenger 14 based on contact between the passenger 14 and the at least one passenger interface 19 and based on the location of a point of contact between the passenger 14 and the at least one passenger interface 19 relative to the perceived image 12. For example, the monitoring system 49 tracks the movement and position of the passenger's 14 eyes 14E and head 14H. The passenger interface 14 displays information that is perceived by the passenger 14 relative to the floating image 12, as discussed above. When the passenger 14 touches the passenger interface 19, the passenger perceives that they are touching the floating image 12. The system 12 uses parallax compensation to correlate the actual point of contact between the finger-tip of the passenger 14 on the passenger interface 19 to the location on the floating image 12 that the passenger 14 perceives they are touching.

The system 10 may display multiple different blocks of annotated information relative to a floating image 12. As the passenger's 14 head 14H and eyes 14E move, the passenger's head 14H and eyes 14E will be positioned at a different distance and angle relative to the passenger interface 19, thus changing the perceived location of displayed information relative to the image 12. By using parallax compensation techniques, such as disclosed in U.S. Pat. No. 10,318,043 to Seder, et al., hereby incorporated by reference herein, the system 10 ensures that when the passenger 14 touches the passenger interface 19, the system 10 correctly identifies the intended piece of annotated information that the passenger 14 is selecting.

A system of the present disclosure offers several advantages. These include providing a floating image that is perceived by the passengers at a centrally location position within the vehicle compartment. This provides a camp-fire like viewing atmosphere where the passengers can all view a common floating image, or each passenger can view a unique floating image. Further, a system in accordance with the present disclosure provides the ability to display annotations and information not embedded within the virtual image and to ensure such annotations and information are perceived by a passenger at a proper location relative to the virtual image. The system also allows a passenger to interact with the virtual image via the touch screen passenger interface and uses parallax compensation to ensure the system correctly correlates passenger input via the passenger interface to annotations and information displayed along with the virtual image.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for generating a centrally located floating three-dimensional image display for a plurality of passengers positioned within a vehicle, comprising:
   at least one display adapted to project an image;
   a plurality of beam splitters, one beam splitter individually associated with each one of the plurality of passengers; and
   at least one passenger interface;
   each beam splitter adapted to receive an image from the at least one display and to reflect the image to the associated one of the plurality of passengers, wherein, each of the plurality of passengers perceives the image floating at a central location within the vehicle;
   the at least one passenger interface adapted to allow the plurality of passengers to receive annotated information and to provide input to the system.

2. The system of claim 1, wherein the at least one passenger interface is a transparent touch screen positioned between the eyes of the plurality of passengers and the perceived image floating at the central location within the vehicle.

3. The system of claim 2, wherein the at least one passenger interface includes a clear cylindrical touch screen.

4. The system of claim 2, wherein the at least one passenger interface includes a plurality of transparent touch screens, one touch screen individually associated with each one of the plurality of passengers.

5. The system of claim 4, wherein each one of the plurality of touch screens is incorporated into one of the plurality of beam splitters.

6. The system of claim 4, wherein each one of the plurality of touch screens is adapted to present visible displayed information only to the associated one of the plurality of passengers.

7. The system of claim 4, wherein each one of the plurality of touch screens is transparent and has a first side and a second side, information displayed on each one of the plurality of touch screens being visible only on the first side.

8. The system of claim 4, wherein each one of the plurality of touch screens is one of flat and curved.

9. The system of claim 2, wherein the at least one passenger interface is an organic light-emitting diode.

10. The system of claim 2, including a monitoring system adapted to monitor the position of a head and eyes of each one of the plurality of passengers, wherein, for each of the plurality of passengers, the system is adapted to display information at a specific location on the at least one passenger interface based on a position of the head and eyes of the passenger.

11. The system of claim 10, wherein, for each of the plurality of passengers, the system is adapted to display information at a specific location on the at least one passenger interface based on the position of the head and eyes of the passenger relative to the perceived image, such that, for each of the plurality of passengers, information displayed on the at least one passenger interface is properly positioned relative to the perceived image.

12. The system of claim 11, wherein the system is adapted to accept input from a passenger based solely on contact between the passenger and the at least one passenger interface.

13. The system of claim 11, wherein the system is adapted to accept input from a passenger based on contact between the passenger and the at least one passenger interface and based on the location of a point of contact between the passenger and the at least one passenger interface relative to the perceived image.

14. The system of claim 11, wherein the at least one display is mounted to one of a roof within the vehicle and within a floor within the vehicle.

15. The system of claim 11, wherein each of the plurality of beam splitters is transparent, wherein a passenger can see through the beam splitter.

16. The system of claim 11, wherein each of the plurality of beam splitters is one of:
mounted to and hanging down from a roof of the vehicle;
mounted to and supported from a floor of the vehicle; and
mounted to and supported on an armrest within the vehicle.

17. The system of claim 11, wherein an orientation of each of the plurality of beam splitters is one of fixed and adjustable.

18. The system of claim 11, wherein each of the plurality of beam splitters is equipped with head tracking capability, wherein an orientation of each of the plurality of beam splitters changes automatically in response to movement of a head of a passenger.

19. The system of claim 11, wherein each of the plurality of beam splitters has one of a flat profile and a curved profile.

20. A system for generating a centrally located floating three-dimensional image display for a plurality of passengers positioned within a vehicle, comprising:
at least one display adapted to project an image;
a plurality of transparent beam splitters, one beam splitter individually associated with each one of the plurality of passengers; and
at least one passenger interface;
each beam splitter adapted to receive a image from the at least one display and to reflect the image to the associated one of the plurality of passengers, wherein, each of the plurality of passengers perceives the image floating at a central location within the vehicle;
the at least one passenger interface including a transparent touch screen positioned between the eyes of the plurality of passengers and the perceived image floating at the central location within the vehicle and adapted to allow the plurality of passengers to receive annotated information and to provide input to the system, the at least one passenger interface further including one of:
a clear cylindrical touch screen;
a plurality of clear touch screens, one touch screen individually associated with each one of the plurality of passengers and adapted to present visible displayed information only to the associated one of the plurality of passengers; and
a plurality of clear touch screens, one of the plurality of touch screens incorporated into each one of the plurality of beam splitters, and adapted to present visible displayed information only to the associated one of the plurality of passengers;
the system further including a monitoring system adapted to monitor the position of a head and eyes of each one of the plurality of passengers, wherein, for each of the plurality of passengers, the system is adapted to display information at a specific location on the at least one passenger interface based on a position of the head and eyes of the passenger relative to the perceived image, such that, for each of the plurality of passengers, information displayed on the at least one passenger interface is properly positioned relative to the perceived image;
the system further adapted to accept input from a passenger based on contact between the passenger and the at least one passenger interface and based on the location of a point of contact between the passenger and the at least one passenger interface relative to the perceived image.

* * * * *